(12) United States Patent
Bratanov (10) Patent No.: US 7,926,048 B2
(45) Date of Patent: Apr. 12, 2011

(54) EFFICIENT CALL SEQUENCE RESTORATION METHOD

(75) Inventor: Stanislav V. Bratanov, Nizhnly Novgorod (RU)

(73) Assignee: Intel Corporation, Santa Clara, CA (US)

(*) Notice: Subject to any disclaimer, the term of this patent is extended or adjusted under 35 U.S.C. 154(b) by 1177 days.

(21) Appl. No.: 11/578,914

(22) PCT Filed: Jul. 26, 2006

(86) PCT No.: PCT/RU2006/000400
§ 371 (c)(1),
(2), (4) Date: Oct. 18, 2006

(87) PCT Pub. No.: WO2008/013470
PCT Pub. Date: Jan. 31, 2008

(65) Prior Publication Data
US 2009/0222803 A1 Sep. 3, 2009

(51) Int. Cl.
 G06F 9/44 (2006.01)
 G06F 9/45 (2006.01)
(52) U.S. Cl. ........ 717/155; 717/131; 717/132; 717/133; 717/151; 717/154; 717/156; 717/157
(58) Field of Classification Search .......... 717/131–133, 717/154–157
See application file for complete search history.

(56) References Cited

U.S. PATENT DOCUMENTS

| | | | | |
|---|---|---|---|---|
| 6,009,258 A * | 12/1999 | Elliott | ............................ | 703/22 |
| 6,014,515 A * | 1/2000 | Burch | ........................... | 717/129 |
| 6,293,712 B1 * | 9/2001 | Coutant | ........................ | 717/155 |
| 6,574,721 B1 * | 6/2003 | Christenson et al. | ......... | 711/209 |
| 6,993,754 B2 * | 1/2006 | Freudenberger et al. | ..... | 717/153 |
| 7,017,153 B2 * | 3/2006 | Gouriou et al. | ................ | 717/158 |
| 7,426,719 B2 * | 9/2008 | Chaiken et al. | ................ | 717/128 |
| 7,480,902 B2 * | 1/2009 | Patil et al. | ....................... | 717/158 |
| 2003/0101380 A1 * | 5/2003 | Chaiken et al. | .................. | 714/38 |
| 2004/0128658 A1 | 7/2004 | Lueh et al. | | |
| 2004/0205409 A1 | 10/2004 | Wu et al. | | |
| 2006/0010431 A1 * | 1/2006 | Patil et al. | ...................... | 717/131 |

FOREIGN PATENT DOCUMENTS

WO WO 2005/013134 A 2/2005

OTHER PUBLICATIONS

Michael Cierniak, et al.; "Practicing JUDO: Java under dynamic optimizations" PLDI '00: Proceedings of the ACM SIGPLAN 2000 Conference on Programming Language Design and Implementation, 2000, XP002437389, ACM Press, pp. 13-26.
International Search Report and Written Opinion; International Application No. PCT/RU2006/000400; Mailing date Jun. 27, 2007; 14 pages.

* cited by examiner

*Primary Examiner* — Wei Y Zhen
*Assistant Examiner* — Qing Chen
(74) *Attorney, Agent, or Firm* — D'Ann Naylor Rifai (57) ABSTRACT

Embodiments of the present invention provide for minimizing the number of procedure frame unwinding operations to be performed when restoring the program control flow information. A first data structure may be constructed to contain procedure linkage information along with references to the conventional memory area where each procedure linkage information element (procedure return address or a procedure frame pointer) was originally found. The first data structure may be initialized upon the initial request for program control flow information. Upon each subsequent request, the contents of the conventional memory area as referenced by the first data structure may be compared with the corresponding elements of the first data structure. As a result of said comparison, changed and unchanged regions within the conventional memory area may be determined. Then, procedure frame unwinding operations may be performed for the changed regions.

15 Claims, 4 Drawing Sheets

EFFICIENT CALL SEQUENCE RESTORATION METHOD

CROSS-REFERENCE TO RELATED APPLICATION

This application is a National Phase application of, and claims priority to, International Application No. PCT/RU2006/000400, filed Jul. 26, 2006, entitled AN EFFICIENT CALL SEQUENCE RESTORATION METHOD.

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Field

The present invention relates generally to the program performance monitoring and analysis domain and, more specifically, to low intrusive methods of program logic restoration, such as constructing statistical control flow graphs and revealing information on procedure call sequences.

2. Description

The ability to reconstruct program flow logic and correlate it with performance characteristics, while employing low-overhead statistical data collection methods, is essential for modern performance monitoring systems. One of the most popular solutions is to build a statistical call graph to restore call sequences for each statistically determined performance hotspot in a program code.

Various techniques may be employed to restore call sequences: some of them are precise and rely on information provided by compilers (e.g., stack unwinding), some are imprecise and employ a heuristic stack search for return addresses and instruction decoding, but all of them are inappropriately intrusive, and cannot be directly applicable to real-time profiling of highly nested code.

The importance of real-time profiling, and hence the requirement of low intrusiveness, can be explained by the inability to correlate performance characteristics with program states since information on the actual program states is absent at the post-processing stage, and the obtained performance results become distorted in case the monitoring system is too intrusive.

Therefore, a need exists for the capability to enable real-time control flow restoration by minimizing the number of stack unwinding operations (or equivalent thereof) and removing the dependency of stack unwinding methods on the number of nesting levels in any given program.

BRIEF DESCRIPTION OF THE DRAWINGS

The features and advantages of the present invention will become apparent from the following detailed description of the present invention in which.

DETAILED DESCRIPTION

An embodiment of the present invention is a method that provides for efficient program control flow restoration by minimizing the number of procedure frame unwinding operations to be performed. The efficiency in control flow restoration may be achieved by mapping the procedure linkage information to its original locations on the stack. By further checking for the differences between such mapping and the actual stack contents upon subsequent requests for control flow information, the changed regions of the stack may be determined, and the procedure frame unwinding operations may be performed over the changed regions only.

Any reference in the specification to "stack", "procedure stack frame", or "frame pointer" should not be construed in a limiting sense with regard to computer architectures that have no explicit support for stack memory and stack manipulation instructions since the terms in question relate more to software convention rather than a particular computer system implementation and denote a memory area to contain procedure linkage information, procedure local execution context, and a reference to the local execution context, respectively. A reference to the above terms should be interpreted as referring to any type of memory (being static or dynamic random-access memory, register files, or similar logic) that is conventionally used to store procedure linkage information and procedure local execution contexts.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

The following definitions may be useful for understanding embodiments of the present invention described herein.

A Statistical Call Graph is a partial program control flow graph reconstructed for statistically discernible code elements (e.g., functions) with performance information assigned to each node; it is typically implemented as a combination of time- or event-based sampling and call sequence restoration upon each sample.

Call Sequence Restoration is a process of determination of the actual sequence of function calls that led to any given code element (address, function); it is typically implemented as stack unwinding.

A Stack for purposes of the present specification is a conventional memory area dedicated to contain procedure linkage information.

Procedure linkage information (PLI) is a partial execution context necessary to establish correct execution transfer between nested procedures (the PLI includes at least a procedure return (link) address, it may also include a frame pointer that provides information on the correct stack frame size allocated for the procedure).

A Procedure Stack Frame is a stack area allocated for each function to store function local execution context, preserved execution context of upper-level functions, a procedure return (link) address, and input parameters.

Stack Frame or Procedure Frame Unwinding is a process of restoring a function's local execution context, interpreting its contents, determining the size of the function's stack frame and locating the return (link) address to the function's caller. The process may be repeated for each function along the call chain.

Figure 1A:
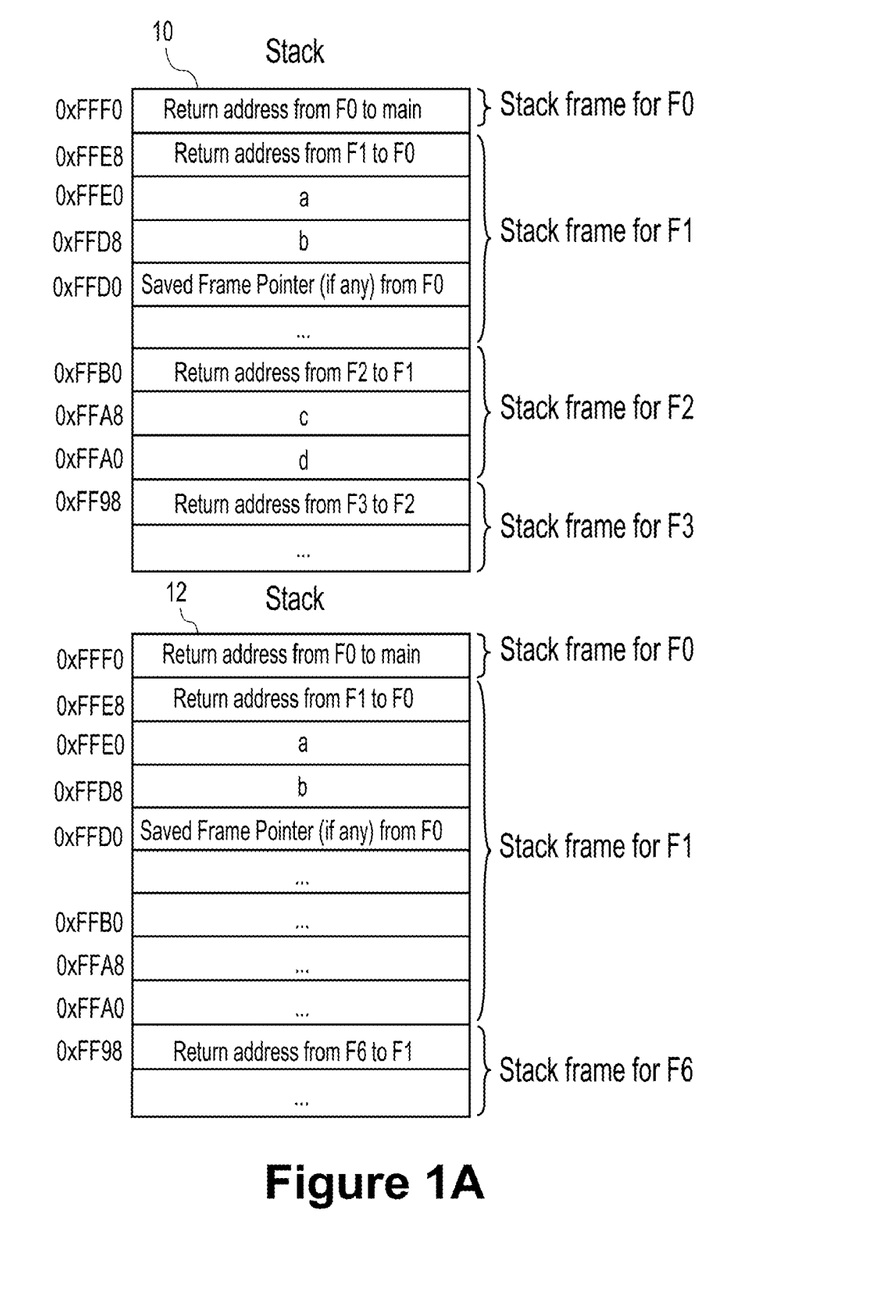
FIGS. 1A and 1B (collectively referred to as FIG. 1 herein) are a diagram illustrating an exemplary stack layout for a given set of nested procedure calls.
Figure 1B:
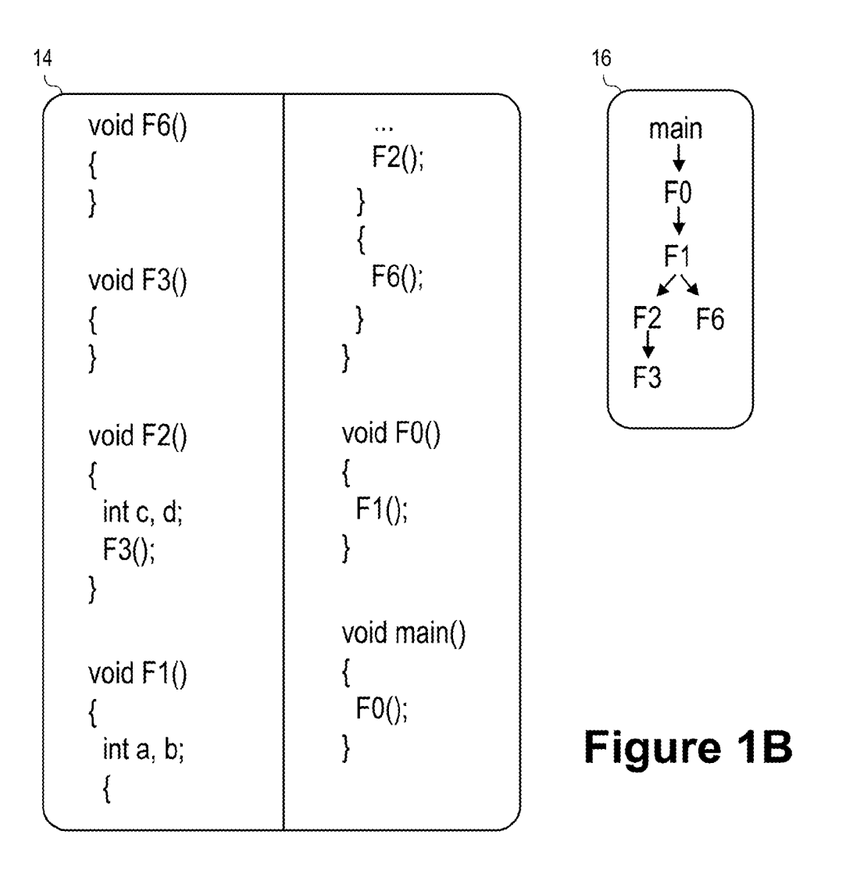

FIGS. 1A and 1B (collectively referred to as FIG. 1 herein) are a diagram illustrating an exemplary stack layout for a given set of nested procedure calls. According to the figure, the execution of exemplary program 14 may result in two different stack frames being formed as shown at blocks 10 and 12. Program 14 has two different control flow paths that are branched at function $F_1$ as shown at block 16. Since the two paths have a common part main-$F_0$-$F_1$, it may be suggested to optimize the profiling of program 14 by restoring procedure linkage information for the common part only once. This may be achieved by means of tracking changes that might have occurred to the actual stack since a previous sample point and applying the procedure frame unwinding (or equivalent methods of determining procedure linkage information) to the changed parts of the stack.

It has to be noted here that the presence of a common part in program execution paths is typical for most software applications, since 90% of the work in an efficient program is usually performed at the same nesting level. Otherwise, in case too much work is distributed over different nesting levels, the efficiency of the program diminishes as a greater part of computational resources is spent on procedure invocation rather than on useful computations. Besides, almost every program built using modern compiler and linker environments has a common unchanging part comprising nested runtime functions.

Embodiments of the present invention may prove efficient for profiling any program, the actual efficiency level depending on the size of the common part in a sequence of nested functions.

Figure 2:
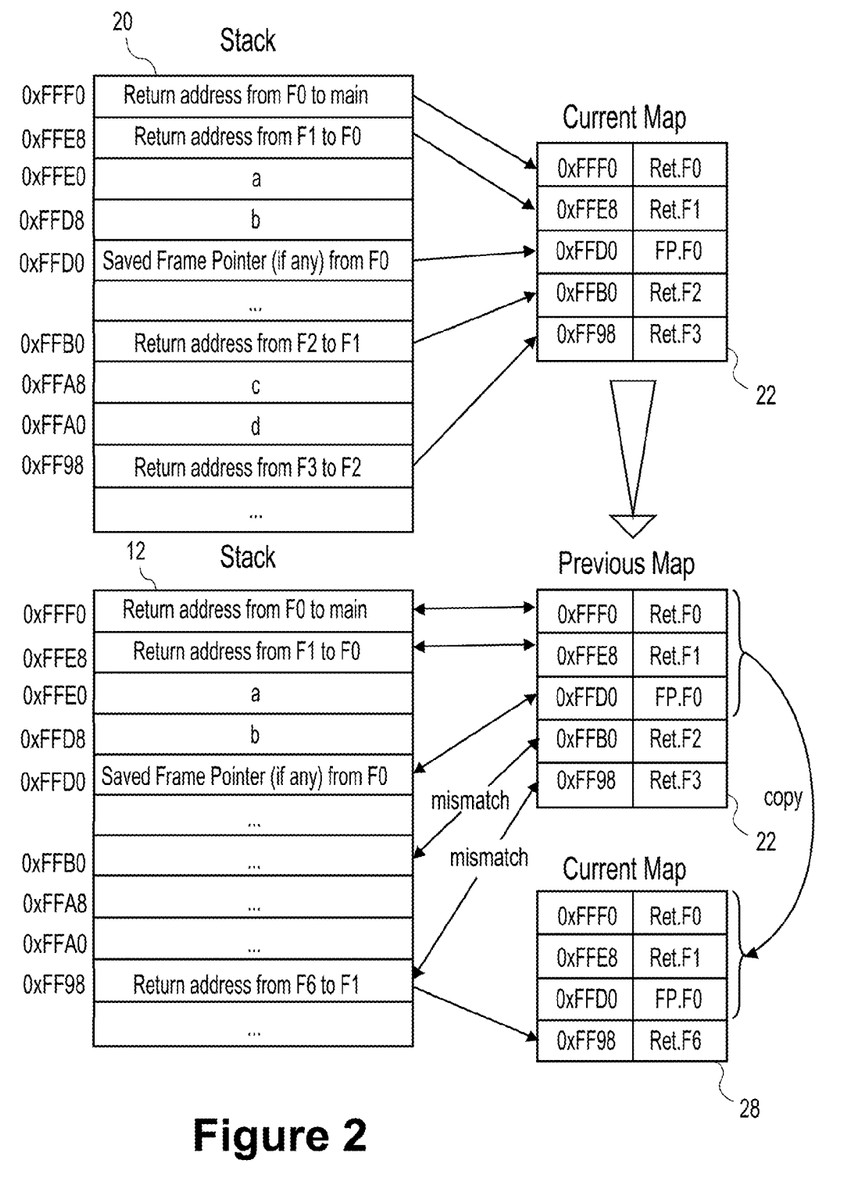
FIG. 2 is a diagram illustrating the formation of data structures employed in the process of call sequence restoration in accordance with an embodiment of the present invention.

FIG. 2 is a diagram illustrating the formation of data structures employed in the process of call sequence restoration in accordance with an embodiment of the present invention. To facilitate the determination of the common part in program control flow paths, map 22 may be created, in the example of FIG. 2, to contain procedure linkage information from stack frame 20. Each element of map 22 may be associated with a reference to the actual location within stack frame 20, wherein the corresponding procedure link address or frame pointer may be found.

The reference to a location of a procedure linkage information element should unambiguously identify the location, and may comprise an offset to a stack base (or a stack pointer) or, as depicted in FIG. 2, a memory address within the stack limits.

Once map 22 is formed, it may be used as a reference map (previous map 26) while processing a subsequent request for program control flow restoration. The reference map may then be compared with the contents of a new stack frame (block 24): elements of map 26 may be respectively compared with the contents of the stack frame at the address associated with each element. The difference between any element of map 26 and the stack contents at the corresponding stack location indicates invocation of a different procedure and, consequently, a different call sequence. The unchanged stack regions do not necessarily imply there has been no change to the regions since the last sample point; in fact, there is no difference with respect to program control flow restoration if the actual changes occurred as long as the sequence of calls, identical to one from the previous sample point is restored.

The borders of changed regions may be determined as follows: the lower border of a changed region may be set to the value of the stack reference from the preceding unchanged element of the map. The higher border of the changed region may be set to the stack reference from the next unchanged element of the map.

Once the changed and unchanged regions of the stack are determined, the actual stack unwinding (or equivalent means to determine procedure linkage information) may be applied to the lowest changed region first. Then, an additional check of whether the newly unwound procedure frames intersect the unchanged regions may be performed.

In case of intersection, the adjacent unchanged region may be marked as changed and concatenated with an upper adjacent changed region (if any). The unwinding operation may be performed upon such a combined formerly-unchanged region in accordance with the above specification.

The procedure linkage information collected for all changed regions may then be stored in map 28 (along with references to corresponding stack locations), and portions of map 26 describing unchanged regions may be copied to map 28, so that the latter describes the entire stack and may be used as the reference map upon further requests for program control flow restoration.

Figure 3:
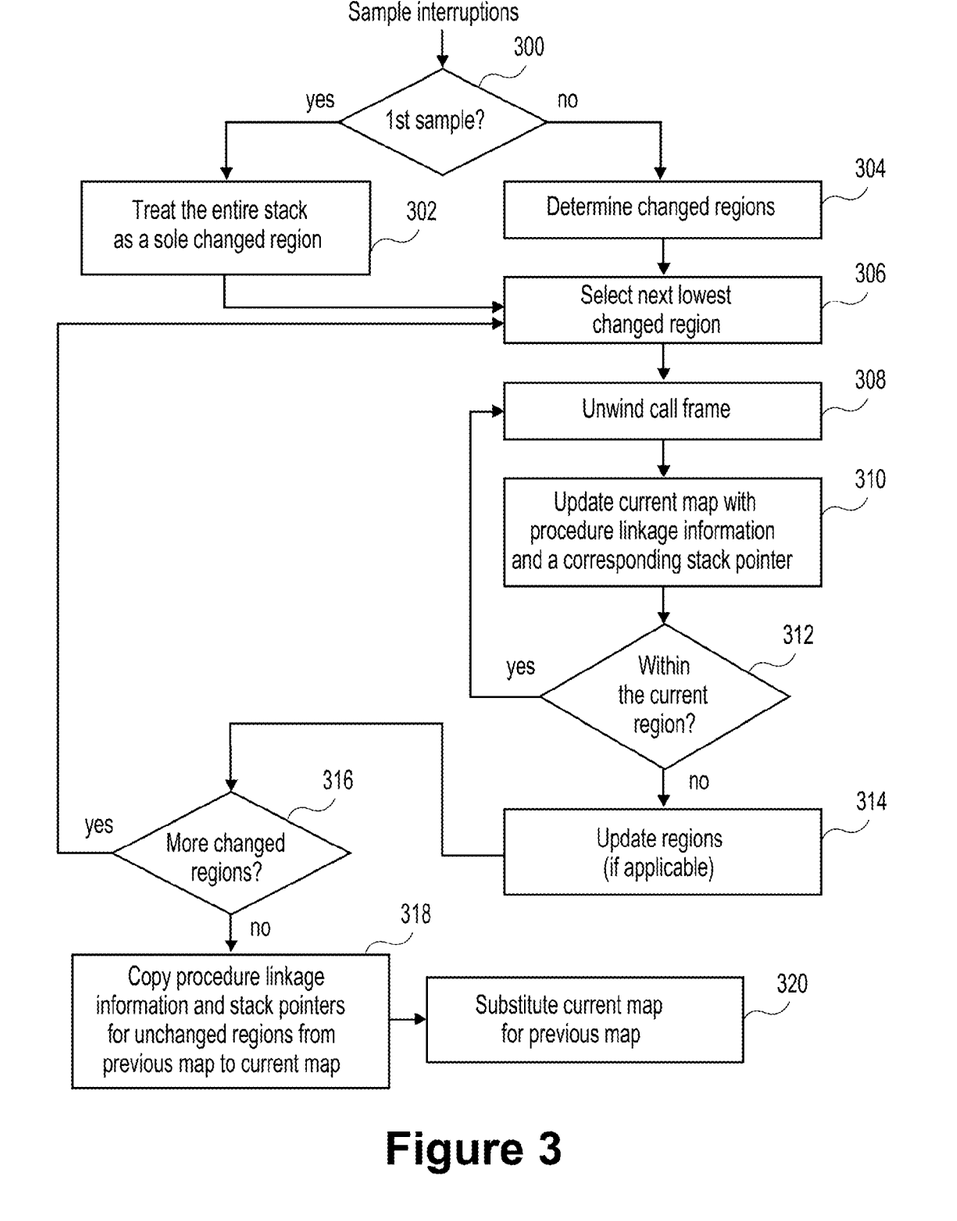
FIG. 3 is a flow diagram illustrating the process of efficient call sequence restoration according to an embodiment of the present invention.

FIG. 3 is a flow diagram illustrating the process of efficient call sequence restoration according to an embodiment of the present invention. According to the figure, upon the initial request for program control flow restoration (as checked at block 300), the entire stack may be treated as a changed region (at block 302) to be analyzed at further steps. Upon all subsequent requests the changed stack regions may be determined at block 304. The determination may be based on procedure linkage information maps as described above.

The process of determining changed regions may be extended if imprecise procedure frame unwinding algorithms are employed (heuristic return address search, for instance, which does not guarantee the collected procedure linkage information to be correct and correspond to actual procedure invocations). In this case each unchanged region may be assigned a confidence level. The confidence level should indicate the probability of error in the determination of unchanged regions.

For example, lower (deeper nested) unchanged regions may be considered of less confidence than upper regions, or an unchanged region surrounded by changed regions may be viewed to be of the least confidence.

A confidence threshold may be established to leverage the precision/computational complexity ratio, and either minimize the number of unwinding operations to be performed or increase the precision by double checking the presumably unchanged regions.

Then, a next changed region may be selected at block 306.

At block 308 a procedure frame may be unwound or an equivalent operation to determine procedure linkage information may be employed.

The current PLI map may be updated with a new procedure linkage information element and a reference to the corresponding stack location at block 310.

The check whether the obtained PLI element is located within the current changed region being analyzed may be performed at block 312. If the PLI element is still within the current stack region, the control may be transferred to block 308, and the procedure frame unwinding may be continued.

Otherwise, the list of changed and unchanged regions may be updated at block 314 in case the last PLI element was obtained beyond the current stack region's boundary (only applicable to precise procedure frame unwinding methods).

Then, in case there are more changed regions left (as checked at block 316), the control may be transferred to block 306 for the selection of the next changed region to process.

After all changed regions have been processed, the current PLI map may be combined with the portions of the previous PLI map describing unchanged stack regions at block 318.

Finally, the current PLI map may be substituted for the previous map (at block 320) to be used as a reference map upon a next request for program control flow restoration.

One skilled in the art will recognize that the invention described herein does not depend on any particular method employed to unwind the stack or determine procedure linkage information. Embodiments of the present invention may rather be used to raise the efficiency of such a method and minimize the number of operations it would otherwise require to restore information on program control flow. Thus, a method wherein procedure linkage information is gathered as a result of specific compiler support, adherence to a software convention, or automatically reported by the processor or dedicated logic, may be combined with the present invention to constitute an efficient profiling system.

For a C language example of an embodiment of the present invention refer to Appendix A. The goal of this code is to illustrate how the number of stack unwinding operations can be minimized by means of mapping pre-unwound procedure return addresses to their original stack locations, and checking the actual stack contents against the mapped values upon each subsequent request for call sequence restoration. One skilled in the art will recognize the option of implementing different mapping algorithms without deviating from the scope of the present invention as long as such algorithms establish unambiguous correspondence between procedure linkage information and its stack locations and provide for detection of changes to the stack in accordance with the method introduced by the present invention.

Furthermore, one skilled in the art will recognize that embodiments of the present invention may be implemented in other ways and using other programming languages.

The techniques described herein are not limited to any particular hardware or software configuration; they may find applicability in any computing or processing environment. The techniques may be implemented in logic embodied in hardware, software, or firmware components, or a combination of the above. The techniques may be implemented in programs executing on programmable machines such as mobile or stationary computers, personal digital assistants, set top boxes, cellular telephones and pagers, and other electronic devices, that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices. One of ordinary skill in the art may appreciate that the invention can be practiced with various computer system configurations, including multiprocessor systems, minicomputers, mainframe computers, and the like. The invention can also be practiced in distributed computing environments where tasks may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine readable medium having stored thereon instructions that may be used to program a processing system or other electronic device to perform the methods. The term "machine readable medium" used herein shall include any medium that is capable of storing or encoding a sequence of instructions for execution by the machine and that cause the machine to perform any one of the methods described herein. The term "machine readable medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

APPENDIX A

© 2006 Intel Corporation

A C code example of efficient stack unwinding.

The present example shows a possible implementation of the algorithm that minimizes the number of procedure frame unwinding operations. The code sample is provided for illustrative purposes only and does not constitute a complete solution for a program logic restoration system. The furnished sample may have dependencies on third-party stack unwinding interfaces which may impose extra restrictions on the compilation process.

The goal of the code is to maintain a map of procedure return addresses, and, upon each request for procedure call chain restoration, compare the actual stack data with the contents of the map. As the result of the comparison, the stack is divided into the changed and unchanged regions. The stack unwinding procedure is performed for the changed region first; then, the position of the last procedure return address in the stack is compared with the region border. If the return address is obtained from a location beyond the changed region, the unchanged region is assumed to be changed and the unwinding procedure is repeated until the end of stack is reached.

A new map of procedure return addresses is constructed by concatenating information of the newly unwound procedure frames and the contents of the previous map portion that correspond to the unchanged stack region.

The new map will be used when processing a subsequent request for program logic restoration.

```
char* altstack_sampling(struct stack_control_t* stk, void** top, void** bottom)
{
   void** addr;
   void** altaddr;
   void** prev_stack;
   void** prev_top;
   void** curr_stack;
   void** curr_top;
   void** region_start;
   void** region_end = 0;
   void** similarity_top;
   void* sp = 0;
   void* ip = 0;
   void* context = 0;
   char* retptr = 0;
   int counter;
/// initialize pointers to the previous and current alt. stack base and top
   prev_stack = (void**)stk->active_stack;
   prev_top = (void**)stk->curr_max;
   if(prev_stack == prev_top) /// the stack wasn't sampled yet
   {
        curr_stack = prev_stack;
      curr_top = prev_top;
   }
   else
   {
      if(prev_stack == (void**)stk->sbuf)
      {
         curr_stack = curr_top = (void**)(stk->sbuf + stk->bsizediv2);
      }
      else
      {
         curr_stack = curr_top = (void**)stk->sbuf;
      }
   }
   region_start = top;
/// search for the first saved alt. esp >= esp (region_start)
/// return found esp value (as region_end) and a pointer to the esp-addr pai
(similarity_top)
   if(prev_stack == prev_top || (void**)(((char*)prev_stack) + stk->bsizediv2) =
prev_top)
   {
      region_end = bottom;
      similarity_top = prev_top;
   }
   else
   {
      similarity_top = 0;
      for(addr = prev_stack; addr < prev_top; addr += 2)
      {
         if((void**)*addr >= region_start)
         {
            if(*(void**)*addr == *(addr + 1))
            {
               if(!similarity_top)
               {
                  region_end = (void**)*addr;
                  similarity_top = addr;
               }
            }
            else
            {
               similarity_top = 0;
            }
         }
      }
      if(!similarity_top)
      {
         region_end = bottom;
         similarity_top = prev_top;
      }
   }
/// copy the filtered esp/return addr pairs from the search region
/// within the real stack to the current alt. stack
/// (said pairs may be formed as a result of unwinding)
   for(counter = 0; counter < 2; counter++)
   {
      if(!counter)
      {
         addr = region_start;
```

```
            altaddr = curr_stack;
         }
         for(; addr <= region_end && addr < bottom && altaddr <
(void**)(((char*)curr_stack) +
         stk->bsizediv2);)
         {
            context = get_stack_frame(&sp, &ip, context);
            if(!context)
            {
               break;
            }
            addr = (void**)sp;
            *altaddr = (void*)addr;
            *(altaddr + 1) = ip;    /// addr MUST point to IP value on the stack for x86
                              /// platforms (*(altaddr + 1) = *addr)
            altaddr += 2;
            if(addr == region_end)
            {
               break;
            }
         }
         if(!context)
         {
            similarity_top = prev_top;
            break;
         }
         if(!counter)
         {
            if(similarity_top == prev_top)
            {
               break;
            }
            if(sp != *similarity_top)
            {
               region_end = bottom;
               similarity_top = prev_top;
               continue;
            }
            similarity_top += 2;
            break;
         }
      }
      curr_top = altaddr;
      retptr = (char*)curr_top;
/// copy pairs from the previous to the current alt. stack from the similarity_top
/// upto curr_max (i.e., prev_top)
      for(addr = similarity_top, altaddr = curr_top; addr < prev_top && altaddr <
(void**)(((char*)curr_stack) + stk->bsizediv2); addr += 2)
      {
         *altaddr = *addr;
         *(altaddr + 1) = *(addr + 1);
         altaddr += 2;
      }
      curr_top = altaddr;
/// update alt. stack control structure
      stk->active_stack = (char*)curr_stack;
      stk->curr_max = (char*)curr_top;
      return retptr;
}
struct stack_control_t
{
   char* sbuf;           /// alt. stack buffer (0 if not allocated)
   int bsizediv2;        /// buffer size (total) divided by 2
   char* active_stack;   /// pointer to the active buffer half
   char* curr_max;       /// maximum nesting level of a previous sample
};
struct unwind_context_t
{
   CONTEXT context;
   STACKFRAME64 stack;
};
/// takes a pointer to a stack pointer and returns a new value of the pointer to the
next
/// stack frame (via the same input parameter)
/// the returned stack pointer should point to the place where the returned ip is
actually stored
/// context is an opaque pointer to an unwinding context
/// returns NULL in case of error, or a pointer to context
void* get_stack_frame(void** sp, void** ip, void* context)
{
```

-continued

```
struct unwind_context_t* ctx;
if(!context)
{
   ctx = g_proc_desc.curr_thread_desc->unwind_context;
   /// skip one step to avoid address duplication
   if(!StackWalk64(IMAGE_FILE_MACHINE_I386, proc_handle, thread_handle,
       &ctx->stack, &ctx->context, read_proc_mem64, SymFunctionTableAccess64,
       SymGetModuleBase64, 0))
   {
      return 0;
   }
}
else
{
   ctx = (struct unwind_context_t*)context;
}
if(StackWalk64(IMAGE_FILE_MACHINE_I386, proc_handle, thread_handle,
   &ctx->stack, &ctx->context, read_proc_mem64, SymFunctionTableAccess64,
   SymGetModuleBase64, 0))
{
   if(!ctx->stack.AddrReturn.Offset || !ctx->stack.AddrFrame.Offset)
   {
      return 0;
   }
   *ip = (void*)ctx->stack.AddrReturn.Offset;
   *sp = (void*)ctx->stack.AddrFrame.Offset;
   *(char**)sp += sizeof(void*);
   return ctx;
}
return 0;
}
```

What is claimed is:

1. In a system collecting program control flow information a computer-implemented method comprising:
   determining changed and unchanged memory regions in a conventional memory area of the system, the conventional memory area being dedicated to store procedure linkage information, by comparing contents of the conventional memory area with contents of a first data structure;
   collecting procedure linkage information from all changed memory regions of the conventional memory area;
   forming a second data structure to reflect all collected procedure linkage information elements along with references to original locations of said elements within the conventional memory area;
   marking unchanged memory regions as changed if an address range between at least one collected procedure linkage element and any point within a changed memory region being currently processed intersects address ranges of the unchanged memory regions;
   combining the second data structure with portions of the first data structure corresponding to the unchanged memory regions of the conventional memory area; and
   substituting the second data structure for the first data structure after all changed memory regions have been processed.

2. The computer-implemented method of claim 1, wherein procedure linkage information comprises at least a procedure link address.

3. The computer-implemented method of claim 1, wherein the entire conventional memory area is determined to be a single changed memory region upon an initial request for program control flow information.

4. The computer-implemented method of claim 1, wherein the first data structure comprises procedure linkage information elements associated with references to original locations of said elements within the conventional memory area.

5. The computer-implemented method of claim 1, wherein comparing contents of the conventional memory area comprises comparing a value of each element of the first data structure with contents of the conventional memory area at an address obtained from a reference associated with a corresponding element of the first data structure.

6. An article comprising: a non-transitory machine accessible medium having a plurality of machine readable instructions, wherein when the plurality of machine readable instructions are executed by a processor, the plurality of machine readable instructions provide for collecting program control flow information by:
   determining changed and unchanged memory regions in a conventional memory area, the conventional memory area being dedicated to store procedure linkage information, by comparing contents of the conventional memory area with contents of a first data structure;
   collecting procedure linkage information from all changed memory regions of the conventional memory area;
   forming a second data structure to reflect all collected procedure linkage information elements along with references to original locations of said elements within the conventional memory area;
   marking unchanged memory regions as changed if an address range between at least one collected procedure linkage element and any point within a changed memory region being currently processed intersects address ranges of the unchanged memory regions;
   combining the second data structure with portions of the first data structure corresponding to the unchanged memory regions of the conventional memory area; and
   substituting the second data structure for the first data structure after all changed memory regions have been processed.

7. The article of claim 6, wherein procedure linkage information comprises at least a procedure link address.

8. The article of claim 6, wherein the entire conventional memory area is determined to be a single changed memory region upon an initial request for program control flow information.

9. The article of claim 6, wherein the first data structure comprises procedure linkage information elements associated with references to original locations of said elements within the conventional memory area.

10. The article of claim 6, wherein instructions for comparing contents of the conventional memory area comprise instructions for comparing a value of each element of the first data structure with contents of the conventional memory area at an address obtained from a reference associated with a corresponding element of the first data structure.

11. A system that collects program control flow information, comprising:
- a processor;
- a conventional memory area dedicated to store procedure linkage information coupled to the processor;
- logic to determine changed and unchanged memory regions in the conventional memory area by comparing contents of the conventional memory area with contents of a first data structure;
- logic to collect procedure linkage information from all changed memory regions of the conventional memory area;
- logic to form a second data structure to reflect all collected procedure linkage information elements along with references to original locations of said elements within the conventional memory area;
- logic to mark unchanged memory regions as changed if an address range between at least one collected procedure linkage element and any point within a changed memory region being currently processed intersects address ranges of the unchanged memory regions;
- logic to combine the second data structure with portions of the first data structure corresponding to the unchanged memory regions of the conventional memory area; and
- logic to substitute the second data structure for the first data structure after all changed memory regions have been processed.

12. The system of claim 11, wherein procedure linkage information comprises at least a procedure link address.

13. The system of claim 11, wherein the entire conventional memory area is determined to be a single changed memory region upon an initial request for program control flow information.

14. The system of claim 11, wherein the first data structure comprises procedure linkage information elements associated with references to original locations of said elements within the conventional memory area.

15. The system of claim 11, wherein logic to compare contents of the conventional memory area comprises logic to compare a value of each element of the first data structure with contents of the conventional memory area at an address obtained from a reference associated with a corresponding element of the first data structure.

* * * * *